United States Patent
Donato (10) Patent No.: US 10,863,145 B2
(45) Date of Patent: Dec. 8, 2020

(54) HELMET WITH VIDEO ACQUISITION DEVICE AND DISPLAY

(71) Applicant: ENERGY LASER S.R.L., Milan (IT)

(72) Inventor: Giuseppe Donato, Basiglio (IT)

(73) Assignee: ENERGY LASER S.R.L., Milan (IT)

( * ) Notice: Subject to any disclaimer, the term of this patent is extended or adjusted under 35 U.S.C. 154(b) by 0 days.

(21) Appl. No.: 15/309,047

(22) PCT Filed: May 5, 2014

(86) PCT No.: PCT/IB2014/061212
§ 371 (c)(1),
(2) Date: Nov. 4, 2016

(87) PCT Pub. No.: WO2015/170136
PCT Pub. Date: Nov. 12, 2015

(65) Prior Publication Data
US 2017/0078622 A1    Mar. 16, 2017

(51) Int. Cl.
*G02B 27/01*    (2006.01)
*A42B 3/04*    (2006.01)
*A42B 3/22*    (2006.01)
*H04N 7/18*    (2006.01)

(52) U.S. Cl.
CPC ........... *H04N 7/185* (2013.01); *A42B 3/0426* (2013.01); *A42B 3/22* (2013.01); *G02B 27/0176* (2013.01); *A42B 3/042* (2013.01); *G02B 2027/0136* (2013.01); *G02B 2027/0138* (2013.01)

(58) Field of Classification Search
CPC .......... G02B 2027/0178; G02B 27/017; G02B 2027/0159; G02B 2027/0154; G02B 23/125; G02B 27/01; G02B 7/002; A42B 3/04; A42B 3/22; A42B 3/10; A42B 3/221; A42B 3/326; B63C 11/06; G09B 9/307; H04N 5/7491
USPC ........................... 345/7, 8, 87; 359/630, 632
See application file for complete search history.

(56) References Cited

U.S. PATENT DOCUMENTS

| | | | | |
|---|---|---|---|---|
| 4,364,636 A | * | 12/1982 | Ellis | ........................ A42B 3/042 2/6.2 |
| 5,682,172 A | * | 10/1997 | Travers | .................. A42B 3/042 345/8 |
| 5,748,346 A | | 5/1998 | David et al. | |
| 5,815,126 A | * | 9/1998 | Fan | ........................ G02B 27/017 345/7 |

(Continued)

FOREIGN PATENT DOCUMENTS

| | | |
|---|---|---|
| FR | 2896192 A1 | 7/2007 |
| FR | 2896194 A1 | 7/2007 |
| JP | H05-50883 A | 3/1993 |

OTHER PUBLICATIONS

International Search Report dated Dec. 23, 2014 issued in PCT/IB2014/061212.

*Primary Examiner* — Nathnael Aynalem
(74) *Attorney, Agent, or Firm* — Scully, Scott, Murphy & Presser, P.C.

(57) ABSTRACT

A helmet with video acquisition device and display, comprising a helmet shell on which at least one video acquisition device is fixed, and a display arranged at one end of a front piece of the helmet; further comprising elements to allow the movement of the display laterally with respect to the active position in which the display is arranged completely in front of the eyes of a user.

7 Claims, 8 Drawing Sheets

(56) References Cited

U.S. PATENT DOCUMENTS

| | | | |
|---|---|---|---|
| 6,016,160 A * | 1/2000 | Coombs | A42B 3/042 |
| | | | 348/61 |
| 6,421,031 B1 | 7/2002 | Ronzani et al. | |
| 2005/0035925 A1* | 2/2005 | Ostromek | G02B 23/125 |
| | | | 345/8 |
| 2005/0057439 A1* | 3/2005 | Hata | A42B 1/245 |
| | | | 345/8 |
| 2006/0048286 A1 | 3/2006 | Donato | |
| 2011/0145981 A1* | 6/2011 | Teetzel | A42B 3/04 |
| | | | 2/422 |
| 2012/0002046 A1* | 1/2012 | Rapoport | A42B 3/04 |
| | | | 348/143 |
| 2012/0317706 A1* | 12/2012 | Lebel | A42B 3/04 |
| | | | 2/422 |
| 2013/0237146 A1* | 9/2013 | Serota | G02B 27/017 |
| | | | 455/12.1 |
| 2013/0287324 A1* | 10/2013 | Nuckolls | A47B 88/463 |
| | | | 384/18 |
| 2014/0000014 A1 | 1/2014 | Redpath et al. | |

* cited by examiner

HELMET WITH VIDEO ACQUISITION DEVICE AND DISPLAY

The present invention relates to a helmet with video acquisition device and display. More particularly, the invention relates to a helmet with a video acquisition device and a display arranged frontally with respect to the visor of the helmet.

Helmets are known commercially which are provided with video acquisition devices constituted by one or more video cameras arranged on the helmet, and are provided with a display that allows the user to view the images acquired by the video cameras.

Usually, the display is mounted frontally with respect to the visor portion of the helmet and can be rotated from the position in which the display is substantially at right angles to the visor of the helmet, and therefore is arranged in front of the view of the user, to an arrangement in which the display can be moved upwardly so as to allow the user to see with his own eyes without the view line being obstructed by the presence of said display.

Devices are known, moreover, which are provided with two micro-displays (one for each eye) arranged in front of the visor of the helmet at the eyes of the user when they are in the active position or in the inactive position raised forward, allowing an unhindered view with both eyes.

As an alternative, larger displays (with a diagonal up to 5") are known in which the problem of alternating vision with an unhindered view or by means of the display remains. In all these cases, the user never has the viewing field completely uncluttered while he views at the images on the display.

Moreover, helmets with video acquisition devices with a monocular micro-display are known in which one eye is covered by the display while the other has an unhindered view, so that one eye of the user can see the live scene and the other can look at the display. In this case, the brain automatically and very quickly keeps on focusing at different distances; it keeps on focusing in the distance with the eye that has an unhindered view while the other eye covered by the display tends to focus close up. The resulting effect is that both eyes keep on focusing at two different distances, in practice acting intensely on the ocular muscles and therefore tiring the eyes.

The aim of the present invention is to provide a helmet with video acquisition device and display, in which the display can be moved from the viewing field of the user, in order to allow to view the real scene simultaneously with the scene of the video camera shown on the display, in addition to viewing the scene unhindered, in addition to viewing the images through the display with both eyes.

Within this aim, an object of the present invention is to provide a helmet with video acquisition device and display in which the display can be arranged in a plurality of different positions.

Another object of the present invention is to provide a helmet with video acquisition device and display that is highly reliable, relatively simple to provide and at competitive costs.

This aim and these and other objects that will become better apparent hereinafter are achieved by a helmet with video acquisition device and display, comprising a helmet shell on which at least one video acquisition device is fixed, and a display arranged at one end of a front piece of the helmet, characterized in that it comprises means to allow the movement of said display laterally with respect to the active position in which said display is arranged completely in front of the eyes of the user.

The image can be of the 2D or 3D type; in this latter case it can be shown on the display of the stereoscopic type with anaglyph images, either polarized or with an autostereoscopic display.

Further characteristics and advantages of the invention will become better apparent from the description of a preferred but not exclusive embodiment of the helmet according to the present invention, illustrated by way of non-limiting example in the accompanying drawings, wherein.

With reference to the figures, the helmet according to the invention, generally designated by the reference numeral 1, comprising a helmet shell 2 that constitutes the body of the helmet, to which a video acquisition device 3 is applied which can be constituted by a front video camera, or by a rear video camera, or by a pair of video cameras or more.

The video acquisition device is powered by a battery pack 4 that is arranged at the rear part of the helmet and is coupled to the shell 2 of the helmet itself.

The helmet has, moreover, a visor portion 5 to which a display 6 is coupled. The visor portion is extended preferably beyond the position of the video acquisition device 3.

The connection between the video acquisition device 3 and the display 6 is entrusted to a connection 7 (wired, as in the figure, or wireless).

Figure 1:
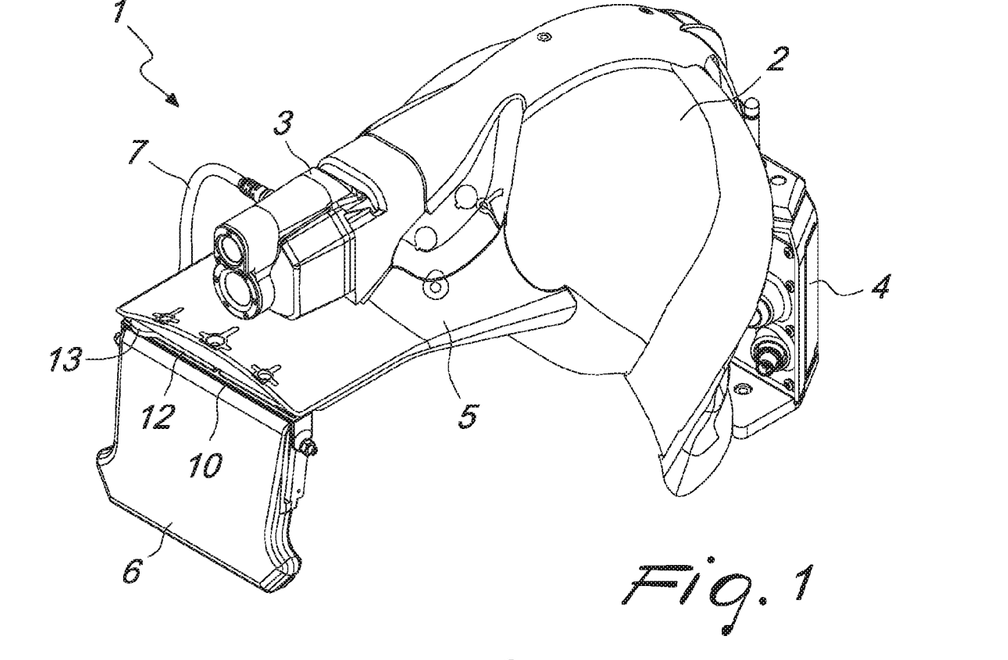
FIG. 1 is a front perspective view of the helmet according to the present invention.
Figure 2:
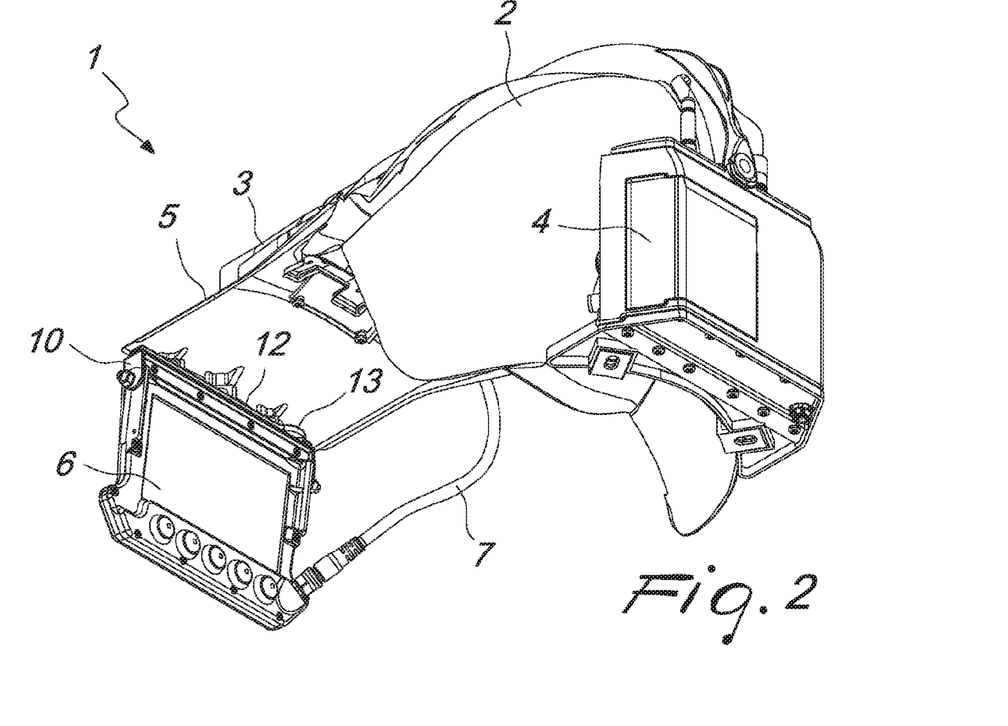
FIG. 2 is a lower perspective view, taken partially from below, of the helmet according to the invention.
Figure 3:
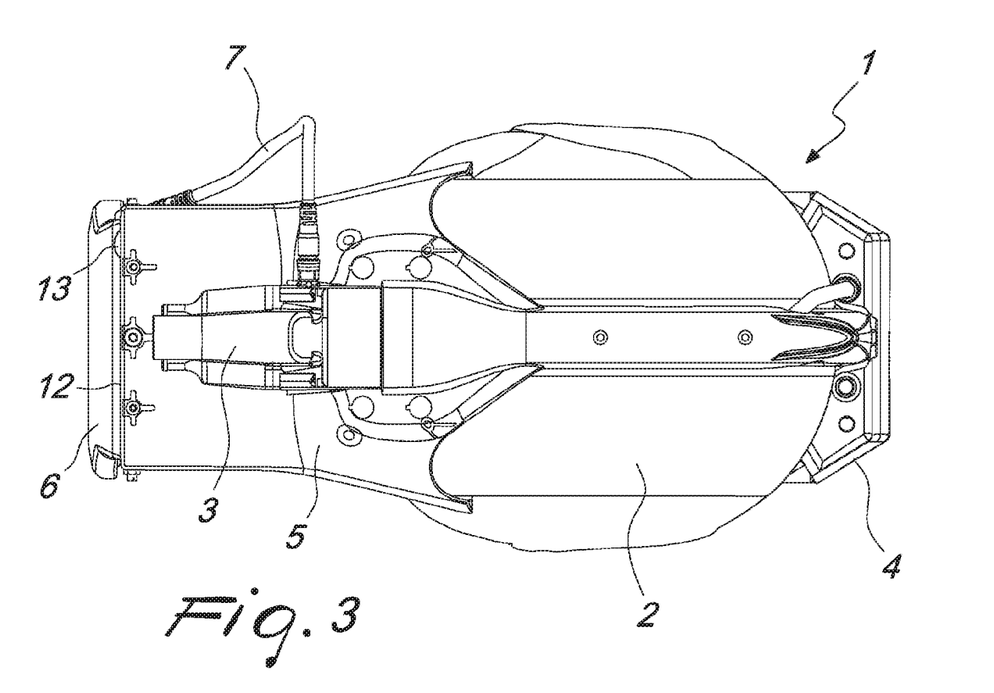
FIG. 3 is a top plan view of the helmet according to the invention.
Figure 4:
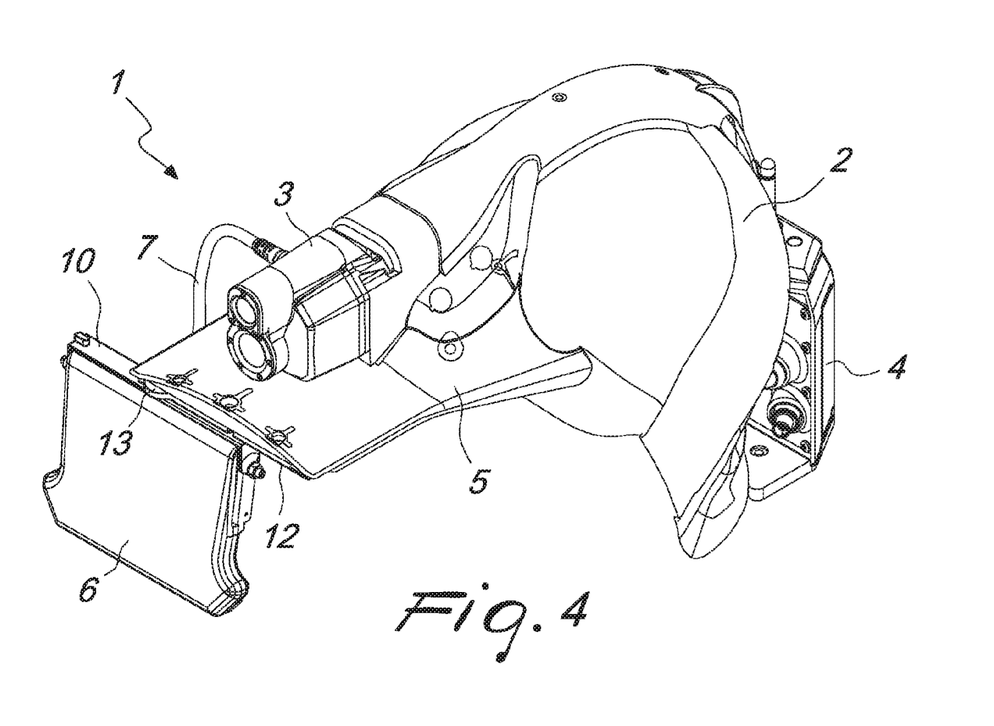
FIG. 4 is a perspective view of the helmet according to the invention, with the display in a position that is different from the one of the previous figures.
Figure 5:
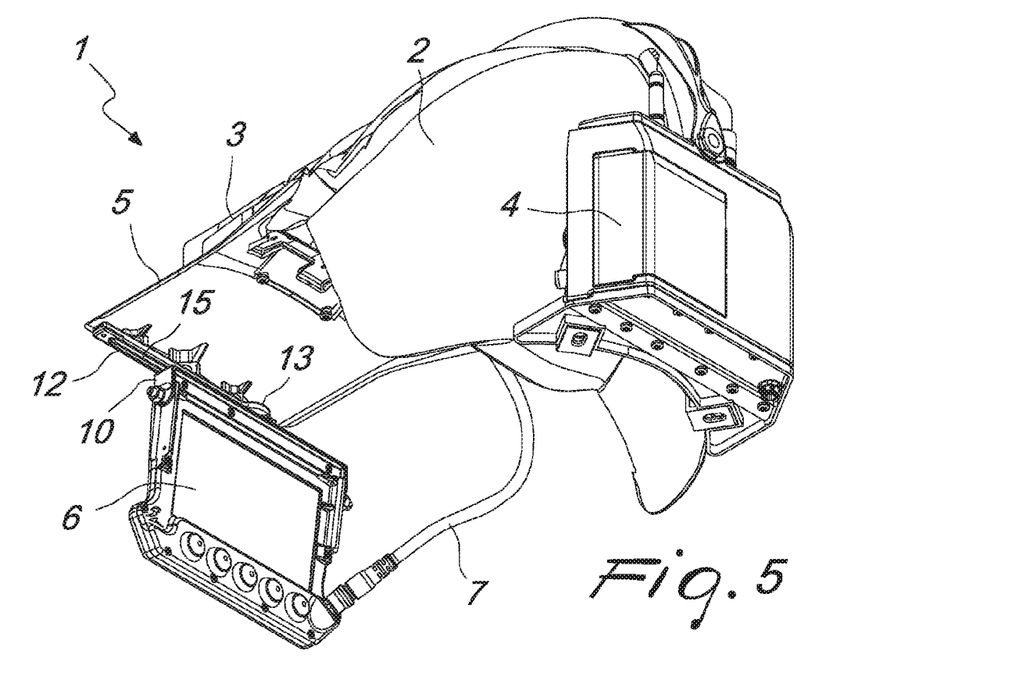
FIG. 5 is a perspective view, taken partially from below, of the helmet according to the invention with the display in the position shown in FIG. 4.
Figure 6:
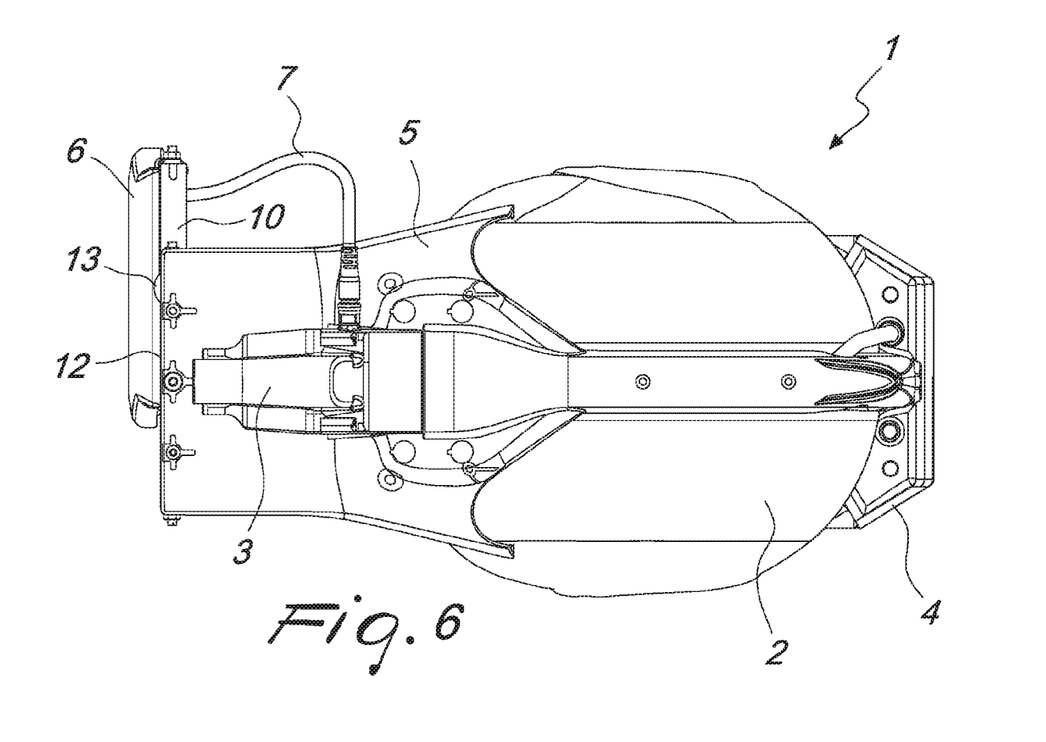
FIG. 6 is a top plan view of the helmet with the display in the positions of FIGS. 4 and 5.
Figure 7:
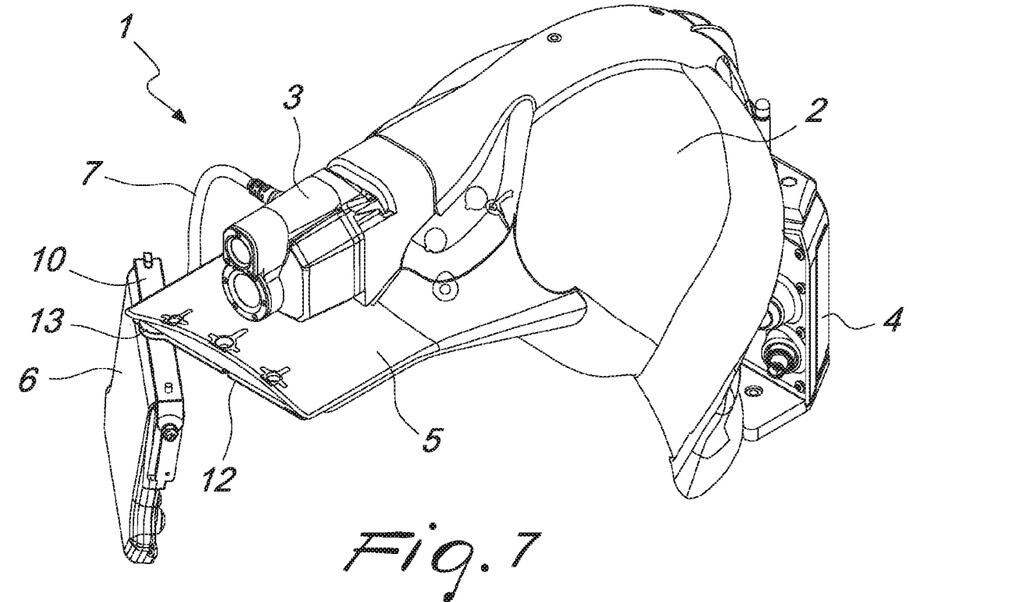
FIG. 7 is a view of the helmet with the display in a further position that is different from the one of the previous figures.
Figure 8:
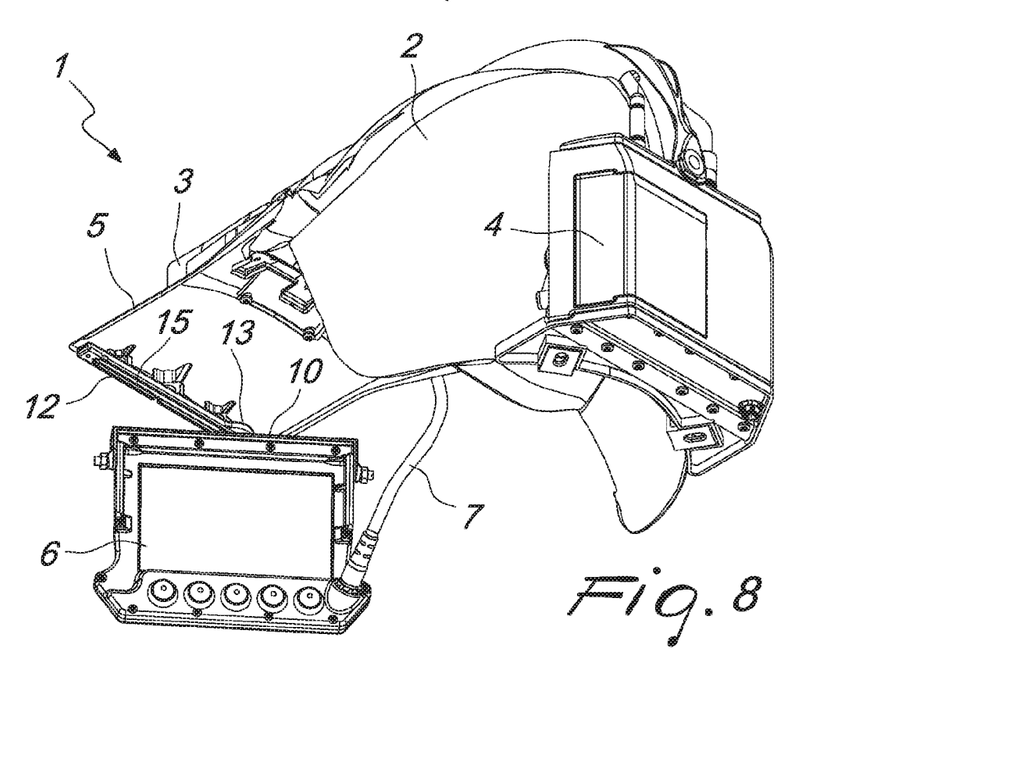
FIG. 8 is a perspective view, taken partially from below, of the helmet according to the invention with the display in the position of FIG. 7.
Figure 9:
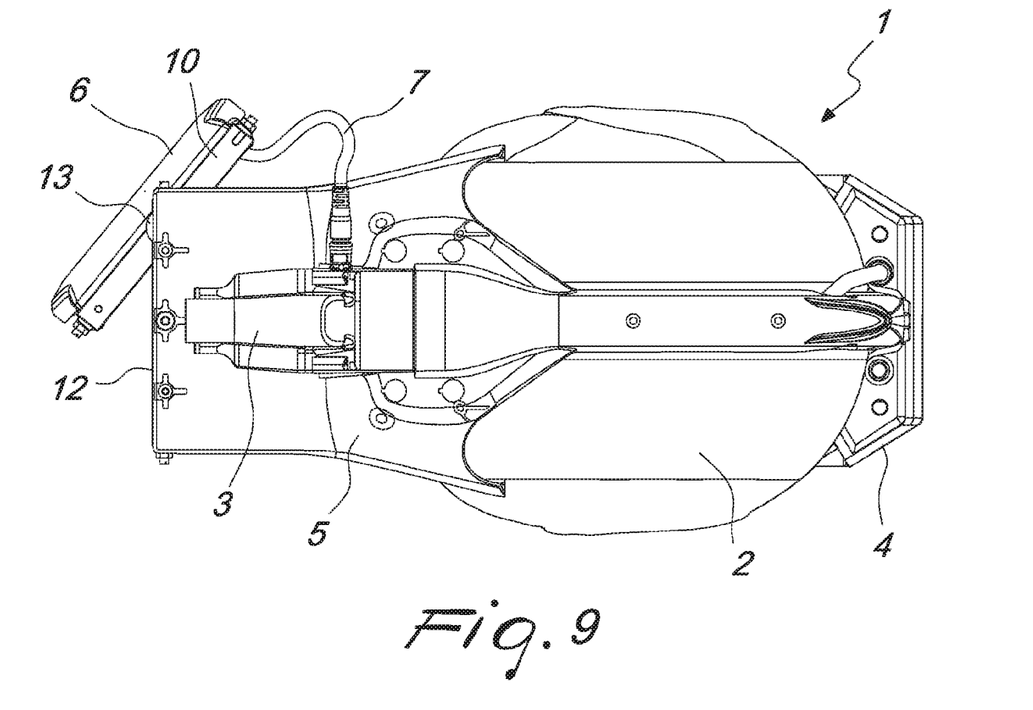
FIG. 9 is a top plan view of the helmet according to the invention, with the display in the position of FIGS. 7 and 8.

One of the particularities of the invention resides in that the display can be moved from an active position, such as the one shown in FIGS. 1, 2 and 3, to a partially active position, as shown in FIGS. 4, 5 and 6, to a position that is still a partially active position but different from the previous position, shown in FIGS. 7, 8 and 9.

The display 6 is provided with means that allow its adjustment from an active position, as shown in FIGS. 1, 2 and 3, to a frontally raised position (totally unhindered direct viewing field) to a position in which the display is moved laterally with respect to the position of FIGS. 1, 2 and 3 (with fixed focus for the right eye), as shown in FIGS. 4, 5 and 6, finally to a position, as shown in FIGS. 7, 8 and 9, in which the display is moved laterally and angled so as to leave the viewing field completely unhindered (with variable focusing distances for the right eye).

Figure 10:
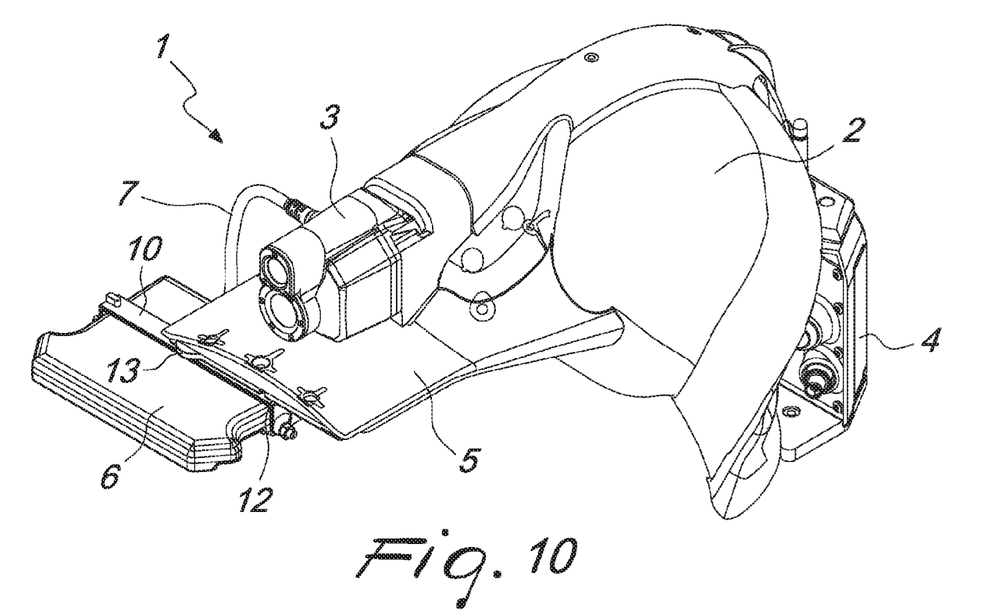
FIG. 10 is a perspective view of the helmet according to the invention, with the display moved laterally and rotated upwardly.
Figure 11:
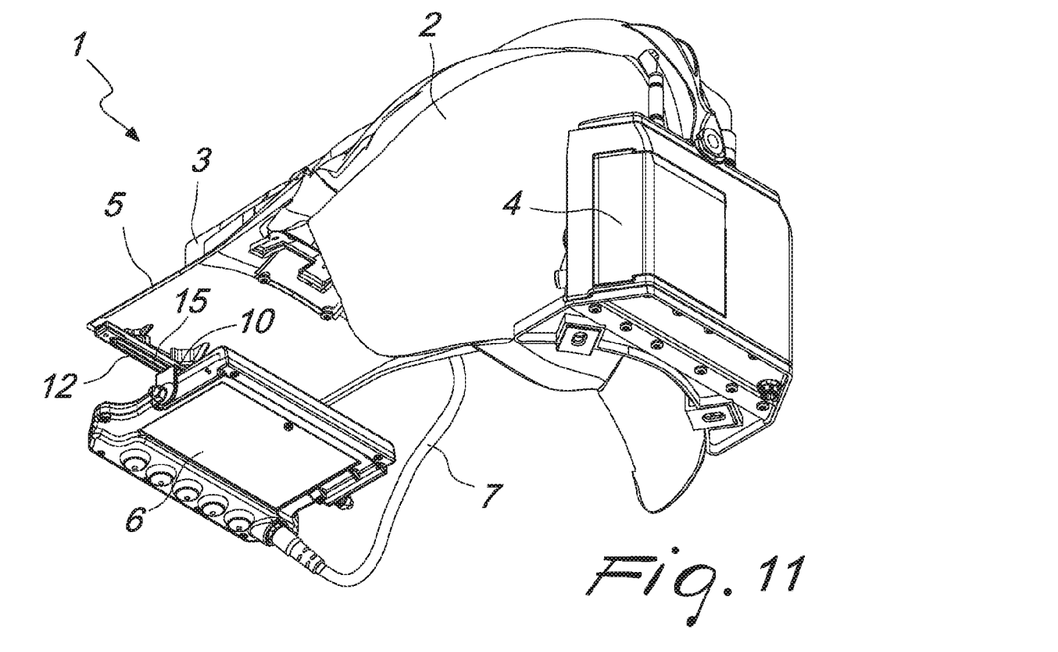
FIG. 11 is a perspective view, taken from below, of the helmet according to the invention, with the display moved laterally and rotated upwardly.
Figure 12:
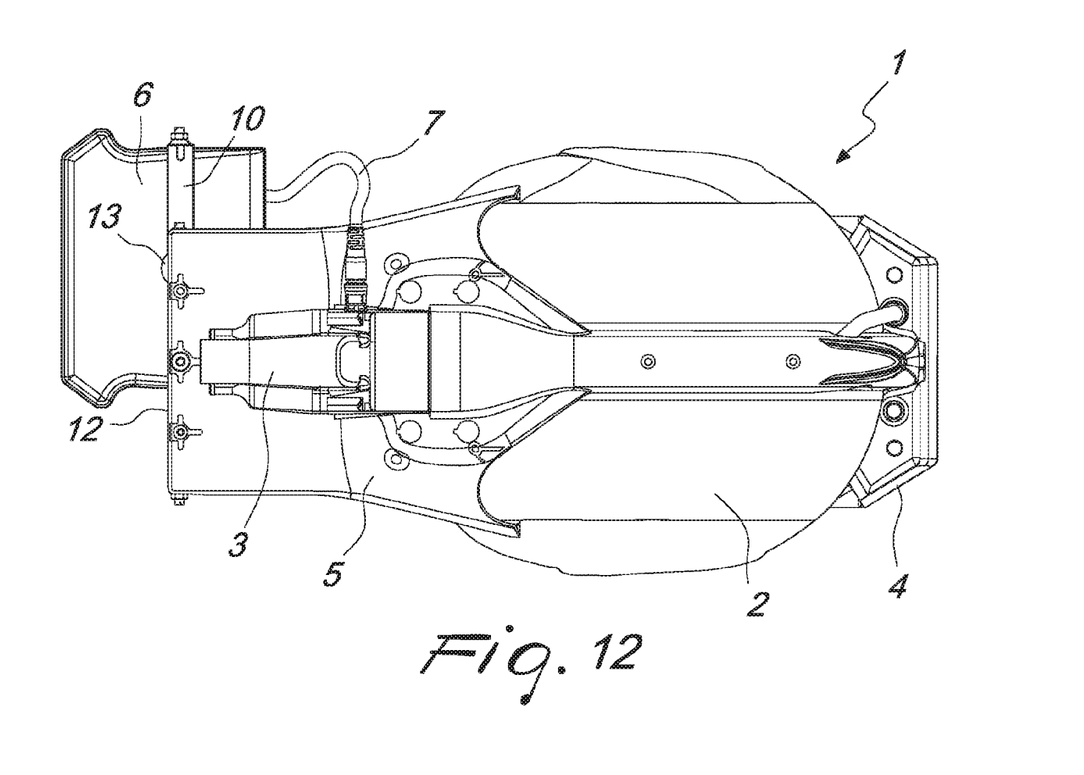
FIG. 12 is a top plan view of the helmet according to the invention, with the display moved laterally and rotated upwardly.
Figure 13:
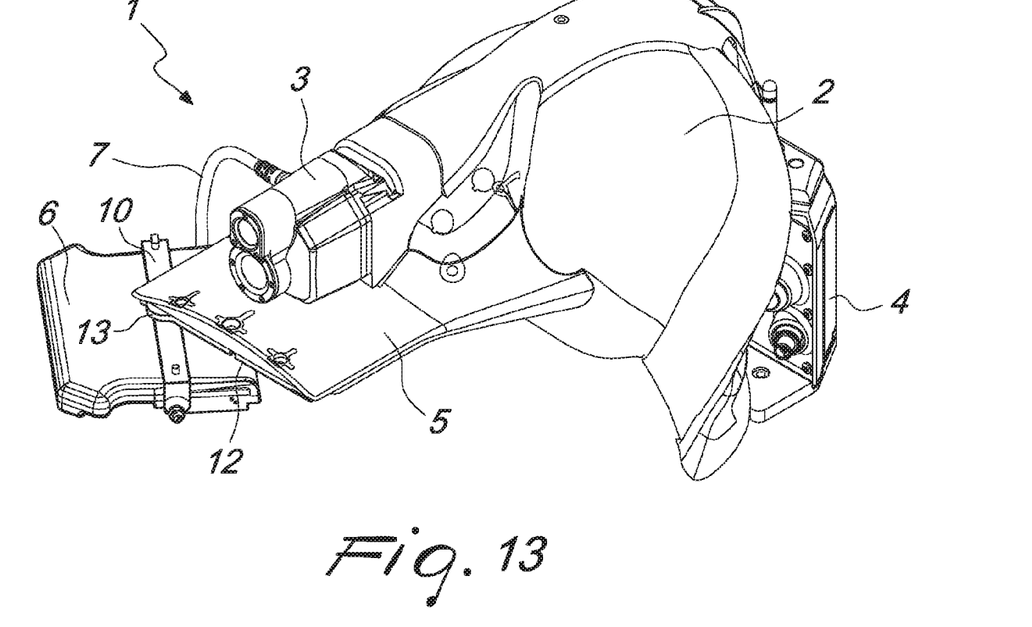
FIG. 13 is a perspective view of the helmet according to the invention, with the display moved laterally, angled and rotated upwardly.

As shown in FIGS. 10, 11 and 12, the display, in addition to being moved laterally and angled, can also be rotated upwardly, both in the position in which the display is arranged in front of the eyes and in the position in which the display is moved laterally, and finally in the position in which the display is moved laterally and angled.

The means for adjusting the position of the display 6 comprise a first guide and a second guide. In particular, the display 6 is provided with a guide 10, which is substantially C-shaped and is connected in an upward region to the display 6.

The display 6 can rotate with respect to the guide 10 by pivoting about pivots 11 that protrude toward the inside of the short portions of the C-shape.

The guide 10 is adapted to mate with a guide 12 provided at the lower edge of the visor portion or front piece 5 of the helmet.

The guide 12 is provided with blocking means 13 adapted to engage a tooth 14 arranged at one end of the guide 12, so as to move the guide 12 to overlap the guide 10 perfectly when the display has to be in the active condition in which it is completely arranged in front of the eyes of the operator. Moreover, rubber washers are present so as to create a block against unintentional rightward sliding of the display.

The sliding of the display 6 connected to the guide 10 is entrusted to a coupling between a slot 15 defined on the lower surface of the guide 12, i.e., the surface designed to face the guide 10, and a protruding pin 16 defined on the upper surface of the guide 10, surface which is intended to face the slot 15 of the guide 12.

Figure 14:
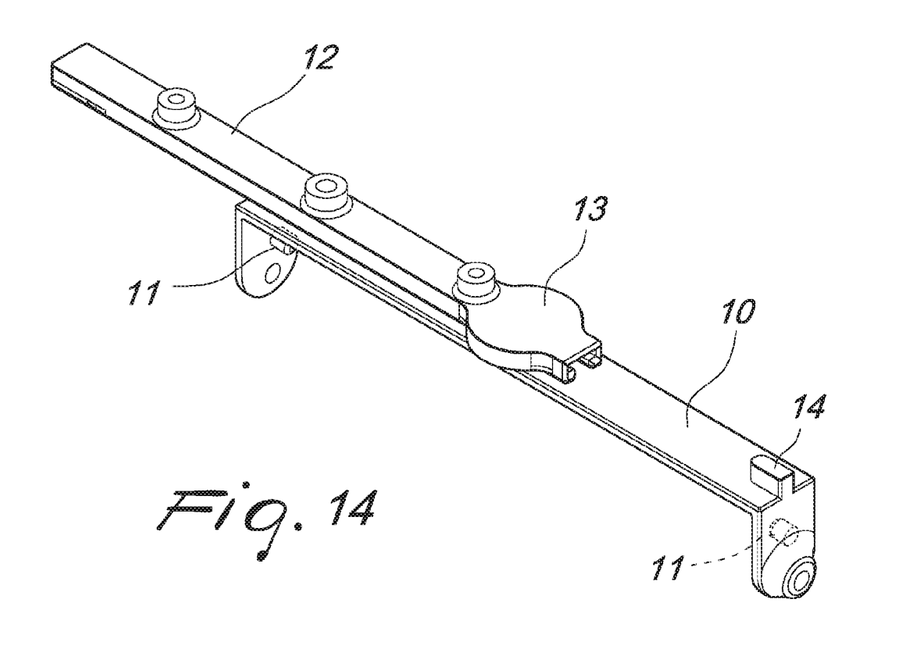
FIG. 14 is a perspective view of the sliding mechanism of the display for the helmet according to the invention.
Figure 15:
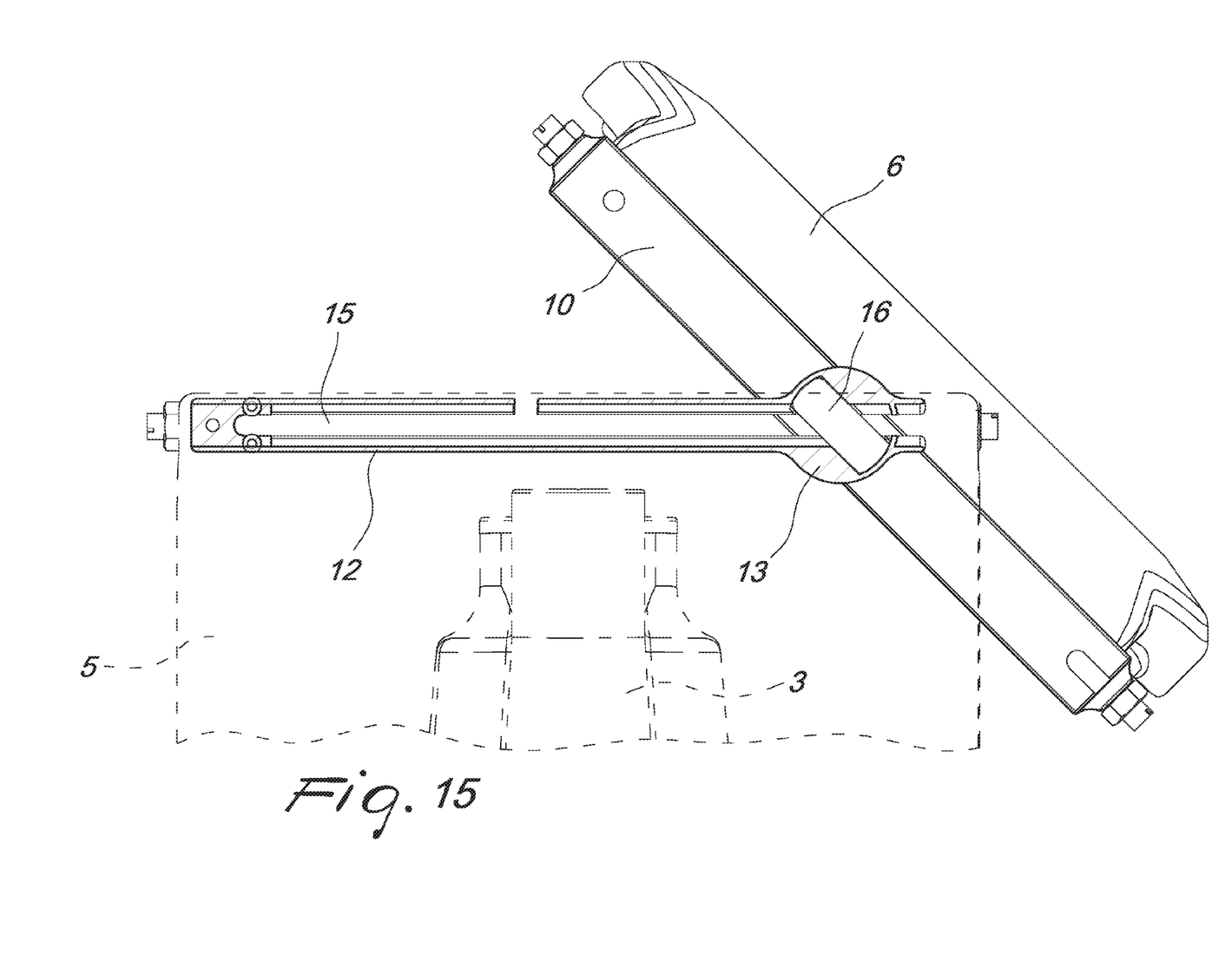
FIG. 15 is a partially sectional plan view from below of the mechanism shown in FIG. 14.

FIG. 15 shows the rotated condition of the guide 10 with respect to the guide 12 coupled to the helmet. FIGS. 14 and 15 show only the system of guides for the sake of simplicity. In this position, the slot 15 descends for a few millimeters in a seat of the guide 13 provided expressly so that, merely by way of the weight of the display, it is in practice locked in the 45° position, in practice blocking the counter clockwise rotation. By way of a slight manual lifting of the display and of the guide 10 anchored thereto, the slot 15 exits from the seat that blocks its rotation and therefore allows the display to rotate counterclockwise in order to bring the guide 10 back in axial alignment with the guide 12.

In all the positions of the display, said display can be rotated upwardly.

The helmet described above allows therefore to have a display that can be arranged according to the requirements of the user, completely in front of the viewing field, or moved laterally thereto, or moved and angled so as to have the viewing field completely unhindered.

The possibility to have the display moved laterally and angled allows the brain not to have a single focusing distance, since the display is angled, and the points of interest can be at a different distance from the eye, and therefore an automatic process is not established by which the brain changes focus automatically, switching between close up and distant, with consequent eye fatigue.

In practice it has been found that the helmet according to the present invention achieves fully the intended aim and objects.

The helmet thus conceived is susceptible of numerous modifications and variations, all of which are within the scope of the appended claims.

Thus, for example, the movement of the display can be motorized.

All the details may further be replaced with other technically equivalent elements.

In practice, the materials used, as well as the contingent shapes and dimensions, may be any according to requirements and to the state of the art.

The invention claimed is:

1. A helmet with video acquisition device and display, comprising:
    a helmet shell on which at least one video acquisition device is fixed,
    a front piece extending from the helmet shell, the front piece substantially parallel with the video acquisition device, and
    a display arranged at a lower edge of a front edge of the front piece, comprising a first means, a second means, and a third means:
    the first means configured to allow a movement of said display laterally with respect to an active position in which said display is arranged completely in front of the eyes of a user, wherein said first means is configured to allow the movement of said display to slide frontally with respect to both eyes of the user; and
    the second means configured to allow the rotation of said display so as to move it to a position that is angled and displaced with respect to a front position in which said display is completely in front of the eyes of the user, wherein said second means configured to allow the rotation of said display being also configured to move said display to a position that is angled and laterally displaced with respect to the front position, said position that is angled and laterally displaced with respect to the front position being a position in which the display is rotated about an axis that is orthogonal to the front piece so that the display is operative and arranged so as to be still visible by the user; and
    the third means configured to allow a movement of said display rotatably, on an axis that is parallel to the front edge of the front piece, from the active position to an inactive position, the display in the inactive position being parallel to the front piece, arranged extending outward with respect to the front piece, below said lower edge of said front piece, and
    adjacent the front piece, wherein in the inactive position a portion of the front piece is between a portion of the display and the video acquisition device, and wherein the third means is between the display and the front piece in the inactive position, wherein said third means configured to allow the rotation of the display comprise a first guide adapted to be mated to the display and a second guide adapted to be mated to the front of the helmet, and wherein said first guide is provided with a pin adapted to mate in a slot defined on a surface of said second guide adapted to face a surface of said first guide provided with the pin, and wherein the second guide is provided with blocking means configured to engage a tooth arranged at an end of the second guide so as to move the second guide to overlap the first guide when the display is in the active position, said slot being configured to descend, away from the front part, into a seat of the blocking means so that by means of a weight of the display said display is locked from rotating in a 45 degrees position, said slot being configured to ascend, towards the front part, and exit said seat of the blocking means, so that the display and first guide are able to rotate such that the first guide is in axial alignment with the second guide.

2. The helmet according to claim 1, wherein said first guide is provided with a pair of pivots adapted to allow the rotation of said display with respect to said first guide.

3. The helmet according to claim 1, wherein said display can be angled upwardly in any of its active positions.

4. The helmet according to claim 3, wherein said active positions of said display are stable active positions.

5. The helmet according to claim 1, wherein the movement of said display is motorized.

6. The helmet according to claim 1, wherein said display is adapted to display 2D and/or 3D images.

7. The helmet according to claim 1, wherein said video acquisition device is connected to said display by means of a cable or wirelessly.

* * * * *